(12) United States Patent
Hou (10) Patent No.: US 10,071,436 B2
(45) Date of Patent: *Sep. 11, 2018

(54) METHODS AND SYSTEMS FOR RESISTANCE SPOT WELDING USING DIRECT CURRENT MICRO PULSES

(71) Applicant: ArcelorMittal Investigacion y Desarrollo, S.L., Sestao (ES)

(72) Inventor: Wenkao Hou, Schererville, IN (US)

(73) Assignee: ArcelorMittal Investigation y Desarrollo, S.L., Sestao (ES)

(*) Notice: Subject to any disclaimer, the term of this patent is extended or adjusted under 35 U.S.C. 154(b) by 0 days.

This patent is subject to a terminal disclaimer.

(21) Appl. No.: 13/633,297

(22) Filed: Oct. 2, 2012

(65) Prior Publication Data

US 2013/0087533 A1    Apr. 11, 2013

Related U.S. Application Data

(63) Continuation of application No. 12/726,450, filed on Mar. 18, 2010, now Pat. No. 8,278,598.

(60) Provisional application No. 61/234,019, filed on Aug. 14, 2009.

(51) Int. Cl.
  *B23K 11/24* (2006.01)
  *B23K 11/11* (2006.01)
(52) U.S. Cl.
  CPC .......... *B23K 11/241* (2013.01); *B23K 11/115* (2013.01); *B23K 11/24* (2013.01)
(58) Field of Classification Search
  CPC .............................. B23K 11/11; B23K 11/002

USPC ..... 219/130.1, 130.01, 130.51, 76.12, 76.13, 219/86.1, 108, 110, 111, 113
See application file for complete search history.

(56) References Cited

U.S. PATENT DOCUMENTS

| | | | | | |
|---|---|---|---|---|---|
| 3,781,511 | A | * | 12/1973 | Rygiol | ............... 219/137 R |
| 4,273,988 | A | * | 6/1981 | Iceland | ............. B23K 9/092 |
| | | | | | 219/130.51 |
| 4,419,558 | A | * | 12/1983 | Stiebel | .................... 219/109 |
| 4,700,041 | A | * | 10/1987 | Morita | ........... B23K 11/0026 |
| | | | | | 219/95 |
| 4,734,555 | A | * | 3/1988 | Ferguson | .............. 219/109 |
| 5,254,828 | A | * | 10/1993 | Stiebel | .................... 219/110 |
| 5,575,934 | A | * | 11/1996 | Takakuwa et al. | ...... 219/109 |
| 5,618,634 | A | * | 4/1997 | Hosoda | ........... C23C 28/3225 |
| | | | | | 205/104 |
| 6,043,448 | A | * | 3/2000 | Yokoya | ............. B23K 11/063 |
| | | | | | 219/108 |
| 6,225,598 | B1 | * | 5/2001 | Nihei et al. | ......... 219/137 PS |
| 7,256,368 | B2 | * | 8/2007 | Artelsmair | ......... B23K 9/1012 |
| | | | | | 219/127 |
| 8,278,598 | B2 | | 10/2012 | Hou | |

(Continued)

FOREIGN PATENT DOCUMENTS

CN         2357875 Y       1/2000
EP         913224 A2 *     5/1999    .......... B23K 11/25

(Continued)

*Primary Examiner* — Dana Ross
*Assistant Examiner* — Ayub Maye
(74) *Attorney, Agent, or Firm* — Berenato & White, LLC (57) ABSTRACT

Methods and systems for resistance spot welding using direct current micro pulses are described. One described method comprises comprising forming a weld joint by applying a plurality of direct current micro pulses to at least two pieces of materials through a first electrode and a second electrode.

11 Claims, 7 Drawing Sheets

(56) References Cited

U.S. PATENT DOCUMENTS

| | | | |
|---|---|---|---|
| 2003/0132201 A1* | 7/2003 | Kaeseler | B23K 11/253 219/86.41 |
| 2004/0021451 A1* | 2/2004 | Stava | 323/282 |
| 2005/0029234 A1* | 2/2005 | Lu | B23K 11/3009 219/119 |
| 2005/0247679 A1* | 11/2005 | Wang | 219/117.1 |
| 2006/0150388 A1* | 7/2006 | Inada et al. | 29/516 |
| 2006/0283843 A1* | 12/2006 | Soma Raju et al. | 219/76.13 |
| 2007/0220743 A1* | 9/2007 | Tsukamoto et al. | 29/831 |
| 2009/0218323 A1* | 9/2009 | Abe et al. | 219/86.25 |
| 2010/0282718 A1* | 11/2010 | Ananthanarayanan | B23K 11/115 219/118 |
| 2012/0074104 A1* | 3/2012 | Goto | B23K 11/115 219/117.1 |
| 2012/0074113 A1* | 3/2012 | Hasegawa | B23K 11/115 219/127 |

FOREIGN PATENT DOCUMENTS

| | | | | |
|---|---|---|---|---|
| EP | 947278 A2 | * | 10/1999 | ............ B23K 11/24 |
| JP | 58-047581 A | | 3/1983 | |
| JP | 04-309473 A | | 11/1992 | |
| JP | 04-356374 A | | 12/1992 | |
| JP | 06-226455 A | | 8/1994 | |
| JP | 07-178563 A | | 7/1995 | |
| JP | 11-1234567 A | | 5/1999 | |
| JP | 2001-025880 A | | 1/2001 | |
| JP | 2002-134246 A | | 5/2002 | |
| JP | 2007-260690 A | | 10/2007 | |
| JP | 2007-260771 A | | 10/2007 | |
| JP | 2007-268567 A | | 10/2007 | |
| JP | 2007-326139 A | | 12/2007 | |
| JP | 2008-055437 A | | 3/2008 | |
| JP | 2008-296226 A | | 12/2008 | |
| JP | 2008-302425 A | | 12/2008 | |

* cited by examiner

METHODS AND SYSTEMS FOR RESISTANCE SPOT WELDING USING DIRECT CURRENT MICRO PULSES

CROSS-REFERENCE TO RELATED APPLICATION(S) AND CLAIM TO PRIORITY

This is a continuation of non-provisional application Ser. No. 12/726,450 filed Mar. 18, 2010, now U.S. Pat. No. 8,278,598. This application claims the benefit of U.S. provisional application Ser. No. 61/234,019 filed Aug. 14, 2009, entitled "Micro Pulsing Resistance Spot and Seam Welding Method for Sheet Metal Joining," the complete disclosure of which is incorporated herein by reference and to which priority is claimed.

FIELD OF THE INVENTION

The present invention relates to welding, and more particularly to methods and systems for resistance spot welding using direct current micro pulses; including resistance spot welding, including a resistance spot welding method that can be used to weld the same or different sheet materials with extended electrode life, enhanced weld current range, large weld size (high welded joint strength) and the finest micro structure in the weld nugget. This method is particularly suitable for (but not limited to) joining sheet metals with different (heavy, oxidized) coatings, such as USIBOR, hot dip galvanized sheet steels etc.

BACKGROUND OF THE INVENTION

In a typical example of resistance spot welding, a pair of electrodes clamps two or more pieces of materials together by a predetermined force, and passes weld current between the tips of the electrodes through the pieces of materials. As the weld current flows through the pieces of materials, the resistance of the materials to the current flow causes the materials to heat to their inherent melting point. The resulting molten material solidifies under the predetermined clamping force to form the welded joint, or nugget.

Conventional resistance spot welding processes used to weld two or more pieces of sheet materials together may apply alternating current (AC) or direct current (DC). The operational current range is defined as the weld current values between the weld current for the designed minimum weld size (the minimum weld current) and the expulsion weld current (the maximum weld current). The weld current input may be one or more pulses. The time of each weld current pulse may range from one cycle per second to sixty cycles or more per second.

The weld current range is defined as the difference between the lower limit (i.e. the minimum) weld current required to produce the minimum weld nugget size and the upper limit (i.e. the maximum) weld current which causes molten metal splashing. Resistance spot welding (RSW) weldability tests have revealed that when DC weld current mode is employed there is no stable weld current range for thin gauge (0.91 mm) USIBOR® 1500P and a very narrow weld current range for 1.52 mm USIBOR® 1500P. RSW weldability tests have also shown that when AC weld current is used there is a stable weld current range. Experimental results indicate that the deterioration rate of the electrode tip face for DC is much higher than that for AC. The use of higher weld force, longer weld time and larger size electrodes may enlarge the weld current range for DC welding. However, the experimental results also discovered that the improvement for electrode life is very limited from welding parameter optimization.

Both low frequency direct current (DC) resistance welding equipment and middle frequency direct current (MFDC) resistance welding equipment generate constant secondary DC current output for welding. The middle frequency direct current (MFDC) resistance welding equipment utilizes frequency pulses of 400 to 2,500 Hz instead of the frequency of base alternating current (50 or 60 Hz) to transform primary current into secondary current. Thus, the size of MFDC welding equipment is significantly reduced compared to AC and low frequency DC welding equipment. The output welding current of MFDC resistance welding equipment remains constant. Moreover, the MFDC welding equipment does not cause power supply line disturbances as is the case with low frequency DC and AC welding equipment.

MFDC resistance spot welding equipment is widely used in automotive, appliance and aircraft manufacturing industries because of its small size, light weight and controllability, and it is particularly suitable for robotic applications. On the other hand, the size, weight, and/or control of AC RSW equipment is not suitable for the same applications. Therefore, it would be advantageous to develop an innovative resistance spot welding method to obtain a robust resistance spot welding process with enlarged weld current ranges, extended electrode life, fine microstructure in the weld nugget, excellent welded joint strength, or any combination of these features.

SUMMARY OF THE INVENTION

Embodiments disclosed herein provide methods and systems for resistance spot welding using direct current micro pulses.

For example, one embodiment of methods and systems for resistance spot welding using direct current micro pulses comprises a method comprising the steps of forming a weld joint by applying a plurality of direct current micro pulses to at least two pieces of materials through a first electrode and a second electrode. Another embodiment of methods and systems for resistance spot welding using direct current micro pulses comprises a system comprising a first electrode and a second electrode configured to form a weld joint joining at least two pieces of materials together by applying a plurality of direct current micro pulses to the at least two pieces of materials.

Other embodiments and further details on various aspects of the invention, including apparatus, systems, methods, kits, articles, assemblies, and the like which constitute part of the invention, will become more apparent upon reading the following detailed description of the exemplary embodiments and viewing the drawings. It is to be understood that the invention is not limited in its application to the details set forth in the following description, figures, and claims, but is capable of other embodiments and of being practiced or carried out in various ways.

BRIEF DESCRIPTION OF THE DRAWINGS

These and other features, aspects, and advantages of the invention are better understood when the following Detailed Description is read with reference to the accompanying drawings, wherein.

DETAILED DESCRIPTION OF THE PREFERRED EMBODIMENT(S)

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

In one exemplary method for resistance spot welding using direct current micro pulses, a pair of electrodes fixes two pieces of materials (i.e. the workpiece) together by a predetermined weld or clamping force. The pair of electrodes may comprise a copper based alloy, and fix the two pieces of material together by a designed weld force, such as about 5 kN. A weld controller is in communication with the electrodes and configured to control one or more weld parameters, including the weld force, weld current magnitude, weld duration, total number of welds, and off-time duration.

The pair of electrodes applies a plurality of direct current micro pulses to the at least two pieces of materials between the pair of electrodes. The plurality of direct current micro pulses can comprise a series of short (e.g. one millisecond to ten milliseconds) direct current pulses separated by a series of short off-times. The magnitude of each direct current micro pulse may be one to more than twenty thousand amps (e.g. 5,000 amps). By using a sequence of direct current micro pulses, the two pieces of materials are locally melted, thus forming a weld joint which joins the two pieces of materials together.

Figure 1:
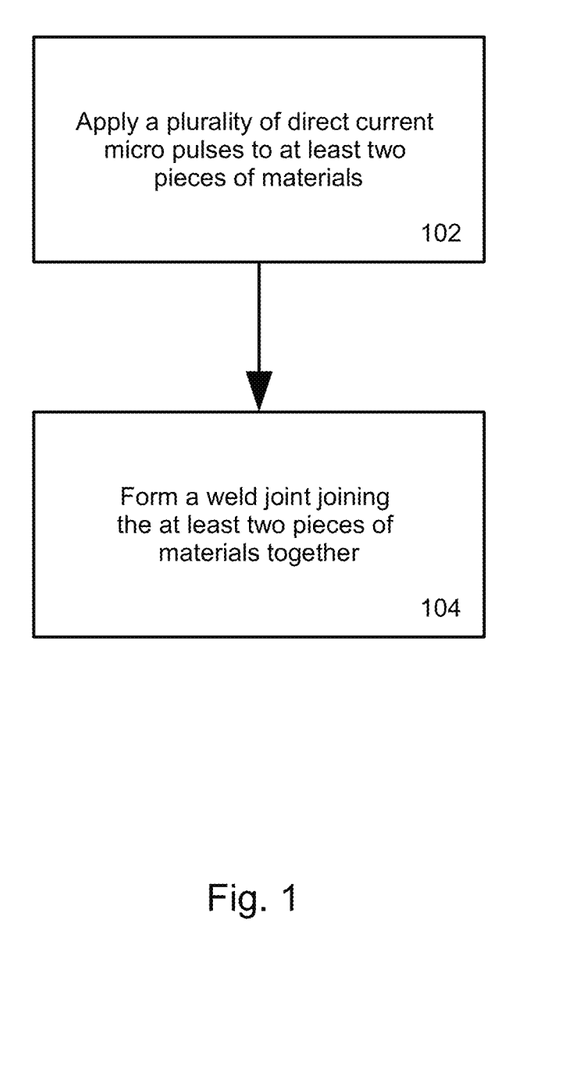
FIG. 1 is a flowchart of a first method for resistance spot welding using direct current micro pulses according to an embodiment of the invention.

Referring now to the drawings in which like numerals indicate like elements through the several figures, FIG. 1 is a flowchart of a first method for resistance spot welding using direct current micro pulses according to an embodiment of the invention. The method begins with a pair of electrodes applying a plurality of direct current micro pulses to at least two pieces of material at 102. The materials may comprise various substances suitable for resistance spot welding, such as one or more types of metal, such as steel. The gauge of the welding material may vary based on the design of the welded joint. For example, in one embodiment, the at least two pieces of materials comprise two pieces of 0.91 mm USIBOR® 1500P Steel.

Each direct current micro pulse may comprise a one to more than twenty kiloamp (kA) pulse with a duration of 1 to 10 milliseconds (ms). In other embodiments, a direct current micro pulse may last for about 1 to 10 ms, and have a magnitude of 1-20 kA (i.e. 1000 amps-20000 amps). Each direct current micro pulse may be separated by a weld current off time. Each weld current off time may last for about 1 to 10 ms. During the weld current off time, no current or very low current is applied to the at least two pieces of materials.

In some embodiments, the weld current off times may be substantially the same duration as the weld current on time (or micro pulse duration). In other embodiments, the weld current off time is different than the weld current on time.

By applying a plurality of direct current micro pulses, a weld joint joining the at least two pieces of materials together is formed at 104. One or more weld joints, or weld nuggets, may be formed or created. In one embodiment, a plurality of weld joints are created along a seam between two materials.

Figure 2:
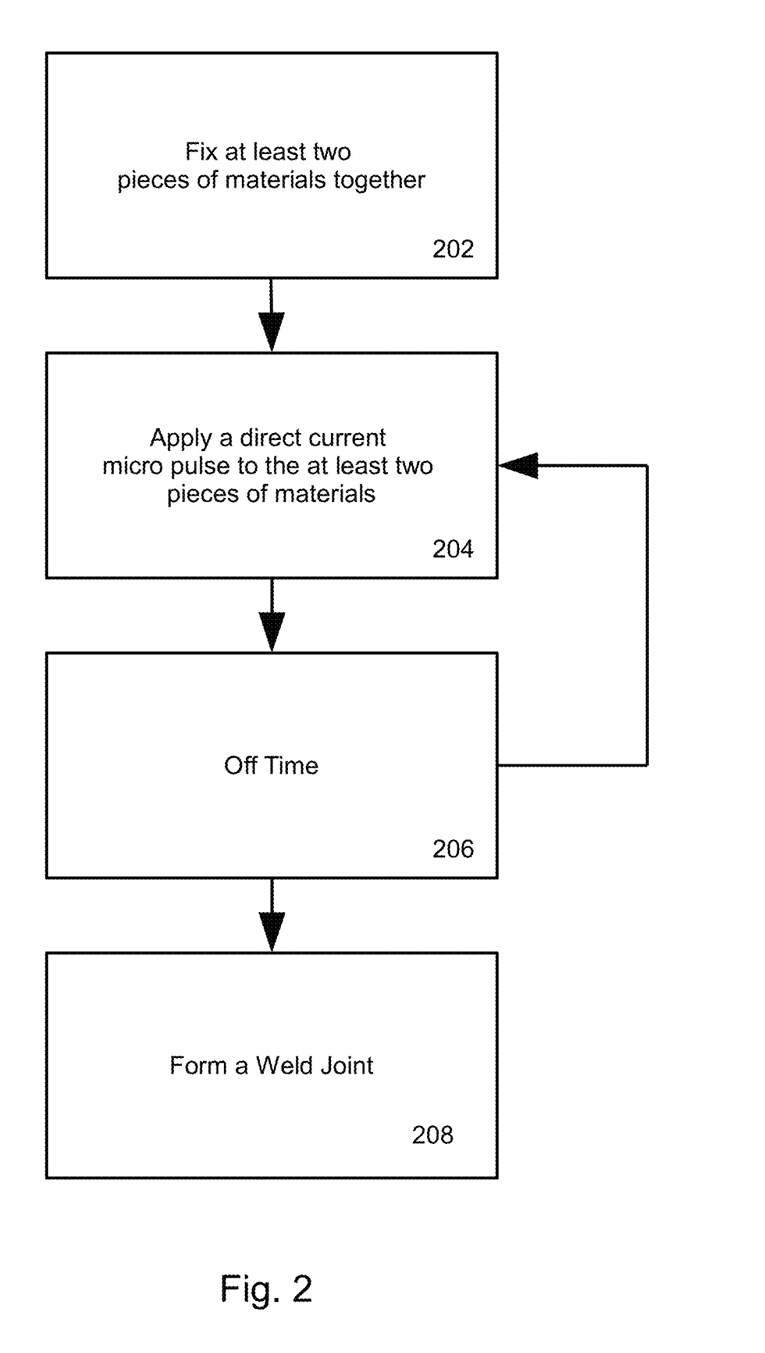
FIG. 2 is a flowchart of a second method for resistance spot welding using direct current micro pulses according to an embodiment of the invention.

FIG. 2 is a flowchart of a second method for resistance spot welding using direct current micro pulses according to an embodiment of the invention. In step 202, at least two pieces of materials are fixed together. A pair of electrodes may fix the materials together at a predetermined weld force. The predetermined force may be about 1-10 kilonewtons (kN). As one example, the electrodes may fix the pieces of material with a force of about 5 kN. In some embodiments, more than two pieces of material are fixed together.

Next, a direct current micro pulse is applied to the at least two pieces of materials at 204. The magnitude of each of the direct current micro pulses may be between 1 kA and 20 kA. The duration of each of the direct current micro pulses may be between 1 ms and 10 ms.

After the direct current micro pulse is applied at 204, the weld current is turned off during an off time at 206. During the off time 206, no current, or a very low current, may be applied. The duration of the off time may be between 1 ms and 10 ms.

Steps 204 and 206 may be repeated as necessary to form the weld joint. The weld strength is determined by the total number and duration of each direct current micro pulse 204 and off-time 206. During the method shown in FIG. 2, the direct current micro pulses 204 heat the localized material between the two electrodes to melting temperature, thus forming the welded joint, or weld nugget.

Figure 3:
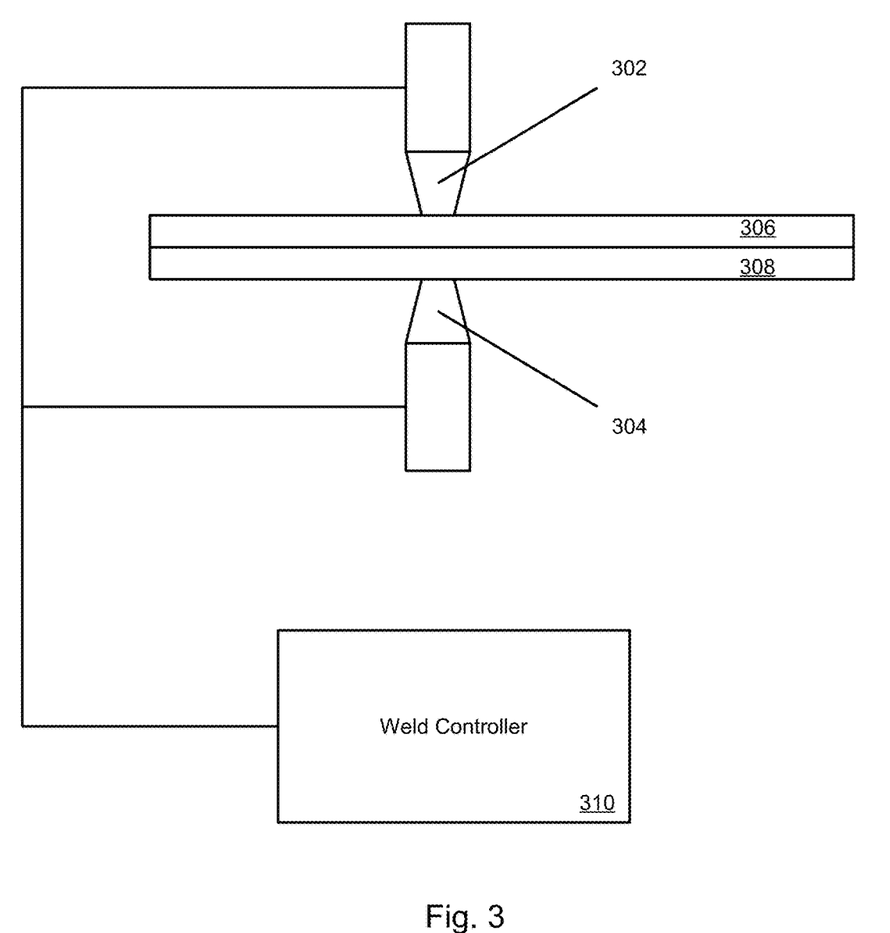
FIG. 3 is a block diagram of a system for resistance spot welding using direct current micro pulses according to an embodiment of the invention.

FIG. 3 is a block diagram of a system for resistance spot welding using direct current micro pulses according to an embodiment of the invention. As shown in FIG. 3, the device comprises a first electrode 302 and a second electrode 304. The first electrode 302 and the second electrode 304 are both shown in communication with a weld controller 310.

The first electrode 302 and the second electrode 304 clamp, or hold together, a first piece of material 306 and a second piece of material 308. The electrodes 302, 304 hold the materials 306, 308 together by a predetermined force. The first electrode 302 and a second electrode 304 are configured to apply an electric pulse, such as a direct current micro pulse, to the workpiece.

The weld controller 310 may control various weld parameters of the welding process. The weld parameters comprise the weld force, the welding frequency (i.e. the duration of the weld pulses and the off times), total welding time (i.e. the total number of the weld pulses), and the welding current. The weld controller 310 may manipulate the various weld parameters based at least in part on specific characteristics of a weld project. For example, the weld controller 310 may control the one or more weld parameters based at least in part on one of a joint design of a weld joint joining the at least two pieces of material together, a gauge of at least one of the at least two pieces of materials, a coating of at least one of the at least two pieces of materials, a material chemical composition of at least one of the at least two pieces of materials, one or more mechanical properties of at least one of the at least two pieces of materials, a size of the pair of electrodes, or a magnitude of the weld force.

In some embodiments, commercially available MFDC resistance spot welding controllers may be used as the welding controller 310. As one example, the welding controller 310 may comprise the 3000 Series Welding Control of Welding Technology Corporation.

Figure 4:
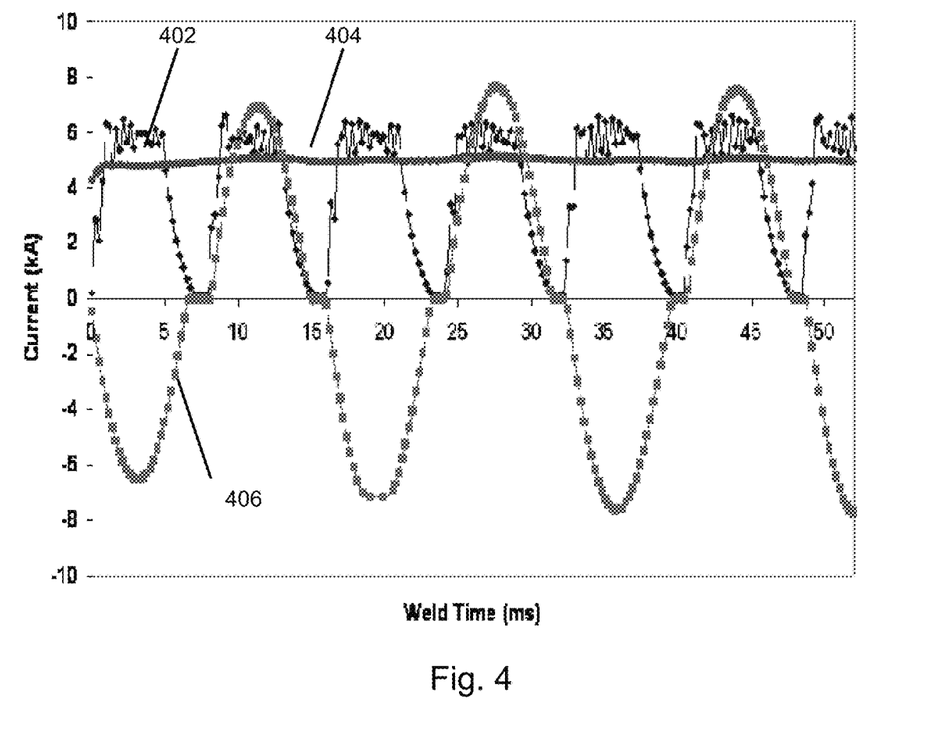
FIG. 4 is a graph showing an example of measured weld current wave forms for a MPDC process, a conventional MFDC process, and a conventional AC process according to an embodiment of the invention.

FIG. 4 is a graph showing an example of measured weld current wave forms for a MPDC process, a conventional MFDC process, and a conventional AC process according to an embodiment of the invention. The y axis, as shown on the left, represents current, measured in thousands of amps (kA). The x axis represents weld time, measured in milliseconds (ms). According to the embodiment shown in FIG. 4, waveforms, or measurements of current over time, are shown for micro pulse direct current 402, direct current of MFDC welding equipment 404, and alternating current 406.

As shown in FIG. 4, one conventional method for resistance spot welding applies a steady direct current 404 to the workpiece. The steady direct current 404 may be about 5 kA (this current varies from 1 to more than 20 kA based on joined materials and gauge), and last for the duration of the welding process. Another conventional method for resistance spot welding applies an alternating current 406 to the workpiece. As shown in FIG. 4, the alternating current 406 periodically alternates between about negative seven (−7) kA and positive seven (+7) kA with a period of about 15 ins (the current varies from 1 to more than 20 kA based on joined materials and gauge).

In contrast to conventional resistance spot welding methods, resistance spot welding using direct current micro pulses 402 uses a sequence of short direct current pulses, or micro pulses. Such short direct current pulses (i.e. micro pulses) contrast with conventional current pulsing cycling, which typically involve pulsing spike widths in excess of 40 ms. As shown in FIG. 4, each micro pulse lasts about 4 ms, and is followed by an off time lasting approximately 4 ms. The duration of the pulse current and the subsequent off time may only last a few milliseconds, for example about 1 to 10 ms. In one embodiment, the direct current micro pulse and off time each last 1 ms. In other embodiments, the direct current micro pulse and off time each last 2 ms, 3 ms, 3.5 ms, 4 ms, 4.5 ms, 5 ms, or 10 ms.

The off time between direct current micro pulses may be of comparable length, e.g., about 1 to 10 ms. In some embodiments, the length of the direct current micro pulse is substantially equal to the length of the off time. In other embodiments, the length of the direct current micro pulse is different than the length of the off time. As one example, a weld having 100 direct current micro pulses may have a total weld time of about 800 ms, with each direct current micro pulse lasting 5 ms, and each off time cycle lasting 3 ms. The plurality of direct current micro pulses may number anywhere from 3 or more, for example, 5, 10, 50, 80, 100, or more micro pulses.

The magnitude of the weld current for each micro pulse, the weld current on and off times, and the total number of micro pulses (or the total weld time) may be adjusted from the weld current controller of the resistance spot welder based on the welded joint design. The magnitude of the direct current micro pulse may be based at least in part on the properties of the materials and gauge to be welded together. For example, the magnitude of the direct current micro pulse may be based on: the gauge of the workpiece, a coating of the workpiece, material chemical composition of the workpiece, mechanical properties of the workpiece, size of the electrodes, applied weld force, and the total weld times.

Micro pulse resistance spot welding offers several advantages over conventional spot welding processes. One advantage of micro pulse resistance spot welding is a longer useful lifetime of the electron tip. In conventional spot welding processes, electrodes may degrade, and have a useful life of less than 200 welds. However, using micro pulse resistance spot welding, electrode life may be extended to 500 or more welds.

Figure 5:
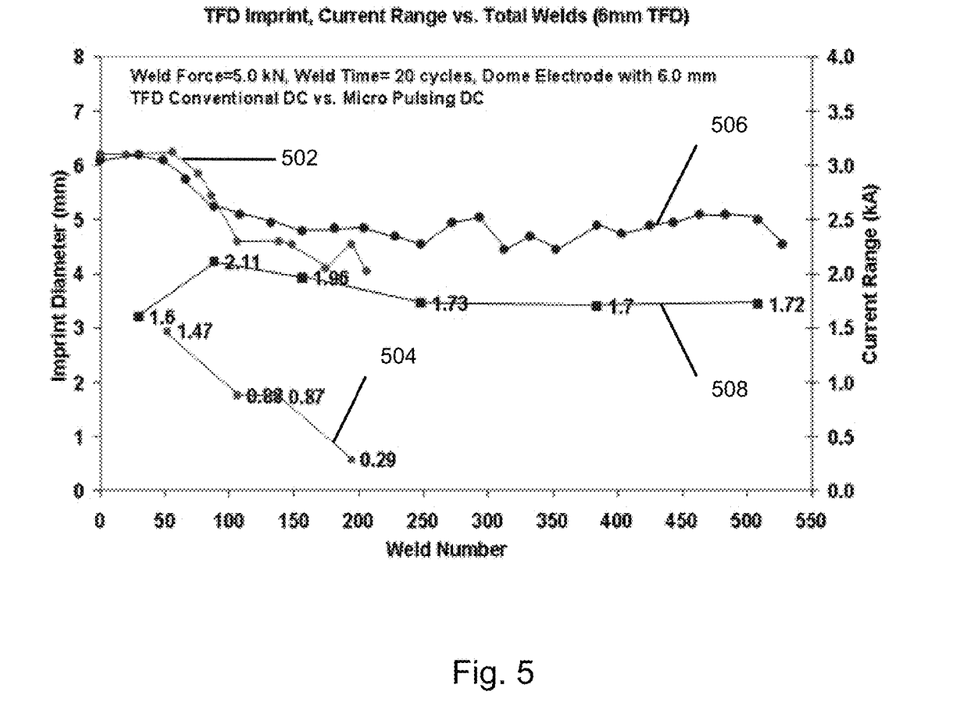
FIG. 5 is a graph showing an example of measured weld current range comparisons of conventional MFDC process and a MPDC process according to an embodiment of the invention.

FIG. 5 is a graph showing an example of measured weld current range comparisons of conventional MFDC process and a MPDC process according to an embodiment of the invention. A conventional middle frequency direct current resistance spot welding process is represented by DC curves 502, 504. A micro pulse direct current spot welding process according to one embodiment of the invention is represented by MPDC curves 506, 508. Both conventional and micro pulse direct current welds were measured during a weld process using 0.91 mm USIBOR® 1500P. During the weld process, a pair of dome electrodes, each with a 6.0 mm diameter, clamped the 0.91 mm USIBOR® 1500P with a force of 5.0 kN. The weld time was 20 cycles.

A first pair of curves, DC imprint diameter 502 and MPDC imprint diameter 506, illustrates the diameter of an electrode tip imprint during a tested welding process. For these imprint diameter curves, the y axis on the left of the graph represents the diameter of the imprint in millimeters (mm), and the x axis represents number of welds. A second pair of curves, DC current 504 and MPDC current 508, illustrates the current range measured during a tested welding process. For these current range curves, the y axis on the right of the graph represents the current in kA, and the x axis represents number of welds.

According to the MPDC imprint diameter 506, after 500 welds, the micro pulse direct current welds maintained a relatively stable electron tip imprint size (about 4.5 mm compared to the original tip face diameter of 5.0 mm) with a current range between about 2.11 kA and about 1.72 kA. On the other hand, as shown by the direct current imprint diameter 502, the electrode tip imprint dropped below 4.0 mm after only 200 welds in a conventional process. Meanwhile, the weld current range of the direct current process is only 0.29 kA. Thus, the MPDC process provides a longer useful electrode lifetime and excellent weld current ranges as compared to other conventional resistance spot welding processes.

Figure 6:
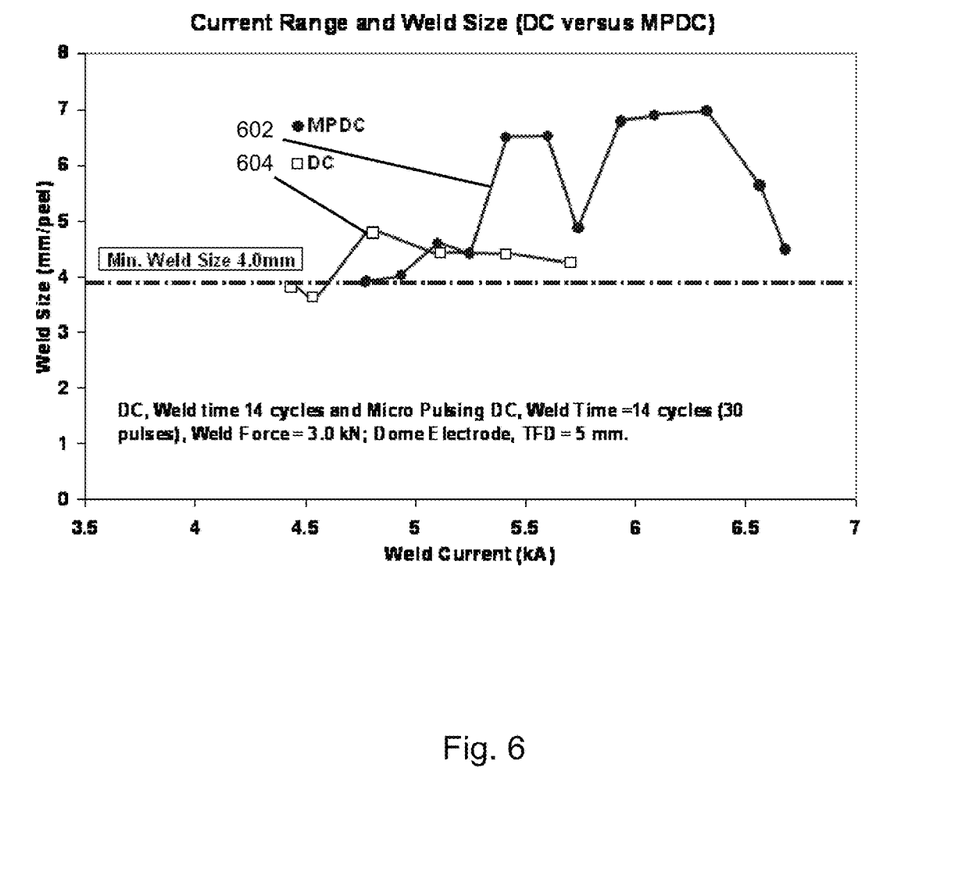
FIG. 6 is a graph showing an example of measured weld size and weld current comparisons of a conventional MFDC process and a MPDC process according to an embodiment of the invention.

Another advantage of micro pulse resistance welding is a larger weld current range. FIG. 6 is a graph showing weld size and weld current comparisons of a conventional MFDC process and a MPDC process according to an embodiment of the invention. A conventional direct current resistance spot welding process is represented by DC curve 604. A micro pulse direct current spot welding process according to one embodiment of the invention is represented by MPDC curve 602. The y axis, shown on the left, represents a weld size (i.e. size of a weld nugget or weld join) in millimeters (mm). The x-axis represents weld current in kA. Both conventional and micro pulse direct current welds were measured during a weld process using 0.91 mm USIBOR® 1500P. During the weld process, a pair of dome electrodes, each with a 5.0 mm diameter, clamped the 0.91 mm USIBOR® 1500P with a force of 3.0 kN. The weld time was 14 cycles.

As shown in FIG. 6, a conventional direct current resistance spot welding process 604 has a relatively small weld current range (from about 4.6 kA to 5.75 kA) for a reliable weld size of +4 mm is. On the other hand, the weld current range for resistance spot welding using direct current micro pulses is almost double, between about 4.75 kA and 6.75 kA.

Methods and systems for resistance spot welding using direct current micro pulses may also produce larger weld joint sizes than conventional resistance spot welding methods because of the wider weld current range. Compared to conventional welding processes such as MFDC, the MPDC weld current ranger is much wider. Therefore, the welded joint can be produced using much higher weld current. The weld nugget size made with resistance spot welding using direct current micro pulses is much larger than the weld nugget size produced with conventional welding processes. As shown in FIG. 6, under the same conditions, conventional welding techniques may yield weld sizes no bigger than 5 mm, whereas the MPDC process produces weld sizes of 5 to 7 mm. Accordingly, the larger weld joints achieved using direct current micro pulses translate into greater weld joint strength than conventional welding methods. In one scenario, the fracture modes of peel samples for the MPDC methods were more favorable because no interfacial fracture mode was observed.

Figure 7A:
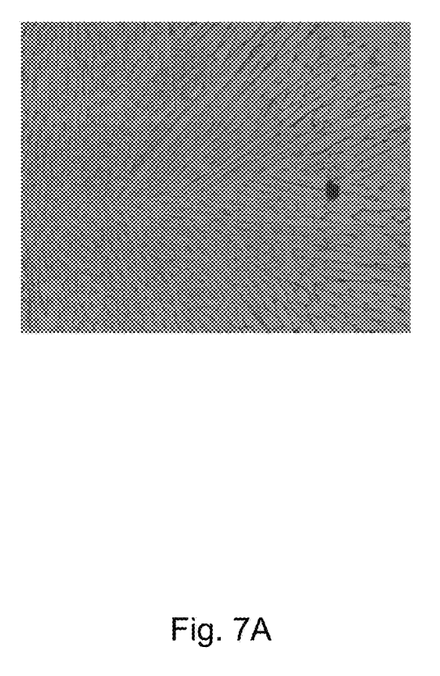
FIGS. 7A and 7B are illustrations of the microstructures of the weld nuggets respectively formed by a conventional DC process and a MPDC process according to an embodiment of the invention.
Figure 7B:
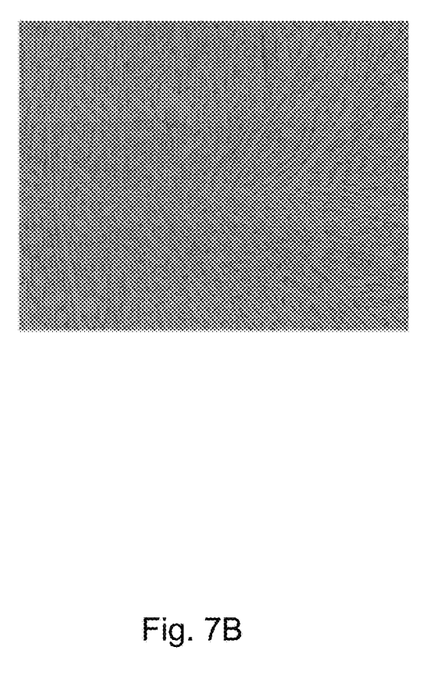

Compared to conventional welding methods, the MPDC method may produce a finer microstructure in the weld nugget. FIGS. 7A and 7B are illustrations of the microstructures of the weld nuggets respectively formed by a conventional DC process and a MPDC process according to an embodiment of the invention. FIG. 7A illustrates the microstructure of a weld nugget produced by conventional DC welding. FIG. 7B illustrates a weld nugget produced by the MPDC process for 0.91 mm USIBOR 1500. As shown in FIGS. 7A and 7B, the MPDC method produces a "clean" weld nugget microstructure, which enhances the weld joint integrity. In some embodiments, the MPDC method produces weld nuggets without oxidized Al/Si inclusions, which may yield stronger weld joints.

The MPDC method may breach the high resistive interfacial contact layer at joining surface with narrow weld current spikes, which makes the method particularly suitable to join sheet metal materials with different coatings (e.g. oxidized aluminum coating, hot dip galvanized coating) or oxidized steel surfaces.

Resistance spot welding with MPDC may have broad applications over a wide variety of industries, including the automotive industry, appliance manufacturing industry, aircraft manufacturing industry, agriculture machinery manufacturing industry, and other manufacturing and/or fabricating industries. One advantage of methods and systems for resistance spot welding using direct current micro pulses are the breadth of materials which can be welded. Some materials that cannot be welded using conventional DC welding processes may be effectively welded by using MPDC resistance spot welding.

The foregoing detailed description of the certain exemplary embodiments of the invention has been provided for the purpose of explaining the principles of the invention and its practical application, thereby enabling others skilled in the art to understand the invention for various embodiments and with various modifications as are suited to the particular use contemplated. This description is not intended to be exhaustive or to limit the invention to the precise embodiments disclosed. Although only a few embodiments have been disclosed in detail above, other embodiments are possible and the inventors intend these to be encompassed within this specification and the scope of the appended claims. The specification describes specific examples to accomplish a more general goal that may be accomplished in another way. Modifications and equivalents will be apparent to practitioners skilled in this art and are encompassed within the spirit and scope of the appended claims and their appropriate equivalents. This disclosure is intended to be exemplary, and the claims are intended to cover any modification or alternative which might be predictable to a person having ordinary skill in the art.

Only those claims which use the words "means for" are to be interpreted under 35 USC 112, sixth paragraph. Moreover, no limitations from the specification are to be read into any claims, unless those limitations are expressly included in the claims.

What is claimed is:

1. A method for joining at least two steel sheets, comprising:
    resistance spot welding comprising forming a weld joint of the at least two steel sheet by applying a plurality of direct current micro pulses to the at least two steel sheets through at least two electrodes for weld current on-times of 1 ms to 10 ms with weld current off-times of 1 ms to 10 ms, wherein the weld current off-times contain no current or very low current relative to the direct current micro pulses, and wherein the plurality of micro pulses are applied through the at least two electrodes to the at least two steel sheets at least until the at least two steel sheets are locally melted by said resistance spot welding; and
    subsequent to locally melting the at least two steel sheets, solidifying the locally melted steel of the at least two steel sheets to form a weld nugget joining the at least two steel sheets together.

2. The method of claim 1, wherein no current is applied through the at least two electrodes to the at least two steel sheets during the weld current off-times.

3. The method of claim 1, wherein the very low current relative to the direct current micro pulses is applied through the at least two electrodes to the at least two steel sheets during the weld current off-times.

4. The method of claim 1, wherein the weld nugget has a fine microstructure.

5. The method f claim 1, wherein the weld nugget has a size of 5 to 7 mm.

6. The method of claim 1, further comprising repeating said forming and solidifying steps to form multiple weld nuggets along a seam between the at least two steel sheets.

7. The method of claim 1, wherein the at least two steel sheets are hot dip galvanized steel sheets.

8. The method of claim 1, further comprising:
    pressing the at least two steel sheets together with a weld force during said alternating of the direct current micro pulses.

9. The method of claim 1, wherein the direct current micro pulses have a magnitude between 1 kA and 20 kA.

10. The method of claim 8, wherein the weld force is between 1 kN and 10 kN.

11. The method of claim 10, wherein the direct current micro pulses have a magnitude between 1 kA and 20 kA.

* * * * *